US009693536B1

(12) United States Patent
Dana

(10) Patent No.: US 9,693,536 B1
(45) Date of Patent: Jul. 4, 2017

(54) PET TRAINING SYSTEM WITH GEOFENCE BOUNDARY INDICATOR AND SOFTWARE APPLICATION

(71) Applicant: Sean P. Dana, Boca Raton, FL (US)

(72) Inventor: Sean P. Dana, Boca Raton, FL (US)

( * ) Notice: Subject to any disclaimer, the term of this patent is extended or adjusted under 35 U.S.C. 154(b) by 0 days.

(21) Appl. No.: 15/378,912

(22) Filed: Dec. 14, 2016

(51) Int. Cl.
| A01K 15/02 | (2006.01) |
| A01K 27/00 | (2006.01) |
| A01K 29/00 | (2006.01) |
| G06Q 50/00 | (2012.01) |
| H04W 4/02 | (2009.01) |
| G08B 3/10 | (2006.01) |
| A01K 11/00 | (2006.01) |

(52) U.S. Cl.
CPC .......... *A01K 15/023* (2013.01); *A01K 27/001* (2013.01); *A01K 27/009* (2013.01); *A01K 29/005* (2013.01); *G06Q 50/01* (2013.01); *G08B 3/10* (2013.01); *H04W 4/021* (2013.01); *A01K 11/008* (2013.01)

(58) Field of Classification Search
CPC .... A01K 15/021; A01K 15/02; A01K 15/023; A01K 27/009; A01K 15/029; A01K 11/006; A01K 11/008; A01K 15/04; A01K 27/001; A01K 29/005; G08B 21/0261
USPC ....... 119/720, 721, 908, 719, 712, 859, 718; 340/573.3, 573.1, 573.2, 573.4
See application file for complete search history.

(56) References Cited

U.S. PATENT DOCUMENTS

| 5,868,100 | A | 2/1999 | Marsh |
| 6,581,546 | B1 | 6/2003 | Dalland |
| 7,034,695 | B2 | 4/2006 | Troxler |
| 7,328,671 | B2* | 2/2008 | Kates ..................... A01K 15/02 119/719 |
| 7,424,867 | B2* | 9/2008 | Kates ................... A01K 15/021 119/719 |
| 7,760,137 | B2 | 7/2010 | Martucci |
| 7,786,876 | B2 | 8/2010 | Troxler |
| 7,848,765 | B2 | 12/2010 | Phillips |
| 8,312,845 | B2 | 11/2012 | Giunta |
| 8,633,981 | B2* | 1/2014 | Russoniello ......... A01K 15/025 348/114 |
| 8,656,865 | B1* | 2/2014 | Foote ..................... A61D 7/00 119/712 |

(Continued)

*Primary Examiner* — Yvonne Abbott-Lewis
(74) *Attorney, Agent, or Firm* — The Concept Law Group, P.A.; Scott D. Smiley; Yongae Jun

(57) ABSTRACT

A pet-related system with a first dog collar operably configured to determine if the first dog collar is at or outside of a first user-selected geofence boundary; and a mobile electronic device communicatively coupled to the first dog collar. The mobile electronic device is operably configured to display a user interface of a first instance of a pet-related social network application associated with a first social network identity; receive a user input selecting the first user-selected geofence boundary of the first dog collar; communicate the first user-selected geofence boundary to the first dog collar; and receive a proximity notification of the mobile electronic device's proximity to a second mobile electronic device communicatively coupled to a second dog collar and operably configured to execute instructions of a second instance of the pet-related social network application associated with a second social network identity.

20 Claims, 6 Drawing Sheets

(56) References Cited

U.S. PATENT DOCUMENTS

| | | | |
|---|---|---|---|
| 8,839,744 B1* | 9/2014 | Bianchi | G08B 23/00 |
| | | | 119/720 |
| 8,922,363 B2 | 12/2014 | So | |
| 9,101,112 B2 | 8/2015 | Giunta | |
| 2012/0000431 A1 | 1/2012 | Khoshkish | |
| 2012/0023169 A1* | 1/2012 | Kang | H04B 13/005 |
| | | | 709/205 |
| 2012/0204811 A1 | 8/2012 | Ryan | |
| 2013/0157628 A1 | 6/2013 | Kim | |
| 2014/0266731 A1* | 9/2014 | Malhotra | G06F 1/163 |
| | | | 340/573.1 |
| 2016/0166156 A1* | 6/2016 | Yuen | A61B 5/0002 |
| | | | 340/573.1 |

* cited by examiner

PET TRAINING SYSTEM WITH GEOFENCE BOUNDARY INDICATOR AND SOFTWARE APPLICATION

FIELD OF THE INVENTION

The present invention relates generally to pet accessories, and, more particularly, relates to a pet accessory with a geofence boundary indicator and an associated social network software application.

BACKGROUND OF THE INVENTION

Pet training and correction systems and methods are well-known. For example, it is known to provide "invisible" fences to restrict dogs to a fixed area, such as a yard. One known invisible fencing system includes a wire buried along a boundary of the yard. The wire radiates a signal that is detected by a device worn by a dog. As the dog approaches the wired boundary, the device detects the signals output by the wire and delivers a correction, such as a shock to discourage the dog from crossing the boundary. Other similar invisible fencing systems include boundaries defined by electronic yard stakes staked into the ground. Unfortunately, such invisible fencing systems are limited to fixed boundaries and require the wire/stakes to be physically removed and repositioned if the user desires to change the boundary line.

Another pet training system provides a GPS receiver in a collar with an associated software application that allows pet owners/trainers to identify the GPS coordinates of the pet wearing the collar for training purposes and/or for finding lost pets. The collar may also include a training device, such as a shocking device, that allows pet owners/trainers to activate the shock through the remote software application. While such pet training systems provide a solution for lost pets and general shock training, controlling the pet's boundaries in such pet training systems requires the pet owner/trainer to independently notice if the pet is approaching a boundary and then delivering a shock as a result. This can be cumbersome, particularly if the user desires to engage in other activities while also training/correcting the pet.

It is generally desirable to walk dogs on a daily basis. Some dog owners prefer not to use a leash for such occasions. Yet other dog owners desire the companionship of their dogs in public places. For such dog owners, there is typically an accompanying risk that their dogs will run away or otherwise move away from them, where trouble may ensue in the form of the dog getting lost, becoming physical with an unknown person or pet, or otherwise causing damage to public places (e.g., parks, restaurants, sidewalks, etc.). Unfortunately, existing invisible fences are not practical for general outdoor use in public places. In addition, other GPS-based solutions only allow owners to locate their dog's GPS coordinates and do not allow owners/trainers to contain their dog within a predefined boundary.

Further, existing pet correct systems do not include a social element that allows pet owners to connect and learn about one another and each other's pets in novel and interesting ways.

Therefore, a need exists to overcome the problems with the prior art as discussed above.

SUMMARY OF THE INVENTION

The invention provides a system and method for a pet training system with geofence boundary indicator and software application that overcomes the hereinafore-mentioned disadvantages of the heretofore-known devices and methods of this general type.

With the foregoing and other objects in view, there is provided, in accordance with the invention, a system of one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect of an embodiment of the present invention may include a pet-related system with a first dog collar including a GPS receiver and a processor operably configured to determine if the first dog collar is at or outside of a first user-selected geofence boundary, and a mobile electronic device communicatively coupled to the first dog collar and including a processor operably configured to execute instructions of a first instance of a pet-related social network application to: display a user interface of the pet-related social network application, the first instance of the pet-related social network application associated with a first social network identity; receive, via the user interface of the pet-related social network application, a user input corresponding to the first user-selected geofence boundary of the first dog collar; broadcast the first user-selected geofence boundary to the first dog collar; and receive a proximity notification of the mobile electronic device's proximity to a second mobile electronic device, the second mobile electronic device communicatively coupled to a second dog collar, different from the first dog collar, and the second mobile electronic device operably configured to execute instructions of a second instance of the pet-related social network application, the second instance of the pet-related social network application associated with a second social network identity, different from the first social network identity. Other embodiments of this aspect include corresponding computer systems, apparatus(es), and computer programs recorded on one or more computer storage devices, each configured to perform the actions of the methods.

Implementations may include one or more of the following features. In accordance with another feature of the present invention, the processor may be further operably configured to execute instructions of the first instance of the pet-related social network application to: receive, via the user interface of the pet-related social network application, a second user input corresponding to a second geofence warning boundary different from the first user-selected geofence boundary, the second geofence warning boundary disposed simultaneously with and within the first user-selected geofence boundary so as to provide a warning prior to the first dog collar being at or outside of the first user-selected geofence boundary; and as a result of the second user input, communicate the second geofence warning boundary to the first dog collar, the processor of the first dog collar operably configured to determine if the first dog collar is at or outside of the second geofence warning boundary.

In accordance with another feature of the present invention, the first dog collar includes a shocking device operably configured to shock a dog wearing the first dog collar as a result of the processor determining that the first dog collar is at or outside of the user-selected geofence boundary.

In accordance with another feature of the present invention, the first dog collar includes a warning indicator that is formed as at least one of a vibrator and a speaker operably configured to at least one of vibrate, via the vibrator, and emit, via the speaker, an audible warning to the dog wearing the first dog collar, prior to shocking the dog, as a result of the processor determining that the first dog collar is at or outside of the second geofence warning boundary.

In accordance with another feature of the present invention, the first dog collar is paired to the mobile electronic device, to the exclusion of the second mobile electronic device; and the second dog collar is paired to the second mobile electronic device, to the exclusion of the first mobile electronic device.

In accordance with another feature of the present invention, the processor is further operably configured to execute instructions of the first instance of the pet-related social network application to receive, via the user interface of the pet-related social network application, a second user input corresponding to a screening selection to prevent the second mobile electronic device from receiving a notification of the mobile electronic device's proximity to the second mobile electronic device.

In accordance with another feature of the present invention, the processor is further operably configured to execute instructions of the first instance of the pet-related social network application to, as a result of receiving the proximity notification of the mobile electronic device's proximity to the second mobile electronic device, display, on a computer display of the mobile electronic device, a user profile of the second social network identity corresponding to the second mobile electronic device that is in proximity to the mobile electronic device.

In accordance with another feature of the present invention, the processor is further operably configured to execute instructions of the first instance of the pet-related social network application to receive, via the user interface of the pet-related social network application, a second user input corresponding to a rating of a pet associated with a third social network identity of a third instance of the pet-related social network application executing on a third mobile electronic device.

In accordance with another feature of the present invention, the proximity notification is received, by the mobile electronic device, as a result of an area defined by the first user-selected geofence boundary overlapping with an area defined by a second user-selected geofence boundary associated with the second dog collar.

In accordance with another feature of the present invention, the first user-selected geofence boundary is a dynamic geofence boundary based on a real-time current GPS location of the mobile electronic device by being automatically updated in real-time as a result of a movement of the mobile electronic device detected by a GPS receiver of the mobile electronic device.

In accordance with another feature of the present invention, the first user-selected geofence boundary is formed as a circle with the mobile electronic device as a center of the circle and the user input is a radius of the circle, the circle moving automatically as the mobile electronic device moves such that the center of the circle remains the mobile electronic device and the radius of the circle remains as indicated by the user input.

A method, in accordance with an embodiment of the present invention, may include receiving, by the processor of the mobile electronic device, via the user interface of the pet-related social network application, a second user input corresponding to a second geofence warning boundary different from the first user-selected geofence boundary, the second geofence warning boundary disposed simultaneously with and within the first user-selected geofence boundary so as to provide a warning prior to the first dog collar being at or outside of the first user-selected geofence boundary; and as a result of receiving the second user input, communicating, by the mobile electronic device, the second geofence warning boundary to the first dog collar, the processor of the first dog collar operably configured to determine if the first dog collar is at or outside of the second geofence warning boundary.

In accordance with another feature, an embodiment of the present invention may further include providing the first dog collar with a shocking device; and shocking a dog wearing the first dog collar as a result of the processor of the first dog collar determining that the first dog collar is at or outside of the first user-selected geofence boundary.

In accordance with another feature, an embodiment of the present invention may further include providing the first dog collar with a warning indicator that is formed as at least one of a vibrator and a speaker; and at least one of vibrating, via the vibrator, and emitting, via the speaker, an audible warning to the dog wearing the first dog collar, prior to shocking the dog, as a result of the processor determining that the first dog collar is at or outside of the second geofence warning boundary.

In accordance with another feature, an embodiment of the present invention may further include receiving, by the processor of the mobile electronic device, via the user interface of the pet-related social network application, a second user input corresponding to a screening selection to prevent the second mobile electronic device from receiving a notification of the mobile electronic device's proximity to the second mobile electronic device.

In accordance with another feature, an embodiment of the present invention may further include receiving the proximity notification further includes: receiving the proximity notification as a result of an area defined by the first user-selected geofence boundary overlapping with an area defined by a second user-selected geofence boundary associated with the second dog collar.

In accordance with another feature of the present invention, the first user-selected geofence boundary is a dynamic geofence boundary based on a real-time current GPS location of the mobile electronic device by being automatically updated in real-time as a result of a movement of the mobile electronic device determined by a GPS receiver of the mobile electronic device.

Yet another general aspect of embodiments of the present invention may include a pet-related method including displaying, on a display of a mobile electronic device communicatively coupled to a first dog collar over a network, a user interface of a first instance of a pet-related social network application, the first instance of the pet-related social network application associated with a first social network identity; receiving, by a processor of the mobile electronic device, via the user interface of the pet-related social network application, a user input corresponding a first user-selected geofence boundary of a first dog collar; communicating, by the processor of the mobile electronic device, the first user-selected geofence boundary to the first dog collar; determining, by a processor and a GPS receiver included in the first dog collar, if the first dog collar is at or outside of the first user-selected geofence boundary; and receiving, by the processor of the mobile electronic device, a proximity notification of the mobile electronic device's proximity to a second mobile electronic device, the second mobile electronic device communicatively coupled to a second dog collar, different from the first dog collar, and the second mobile electronic device operably configured to execute instructions of a second instance of the pet-related social network application, the second instance of the pet-related social network application associated with a second social network identity, different from the first social network identity. Other embodiments of this aspect may include corresponding computer systems, apparatus, and computer programs recorded on one or more computer storage devices, each configured to perform the actions of the methods.

Implementations may include one or more of the following features. In accordance with another feature, an embodiment of the present invention may further include receiving, by the processor of the mobile electronic device, via the user interface of the pet-related social network application, a second user input corresponding to a second geofence warning boundary different from the first user-selected geofence boundary, the second geofence warning boundary disposed simultaneously with and within the first user-selected geofence boundary so as to provide a warning prior to the first dog collar being at or outside of the first user-selected geofence boundary; and as a result of receiving the second user input, communicating, by the mobile electronic device, the second geofence warning boundary to the first dog collar, the processor of the first dog collar operably configured to determine if the first dog collar is at or outside of the second geofence warning boundary.

In accordance with another feature, an embodiment of the present invention may further include providing the first dog collar with a shocking device; and shocking a dog wearing the first dog collar as a result of the processor of the first dog collar determining that the first dog collar is at or outside of the first user-selected geofence boundary.

In accordance with another feature, an embodiment of the present invention may further include providing the first dog collar with a warning indicator that is formed as at least one of a vibrator and a speaker; and at least one of vibrating, via the vibrator, and emitting, via the speaker, an audible warning to the dog wearing the first dog collar, prior to shocking the dog, as a result of the processor determining that the first dog collar is at or outside of the second geofence warning boundary.

In accordance with another feature, an embodiment of the present invention may further include receiving, by the processor of the mobile electronic device, via the user interface of the pet-related social network application, a second user input corresponding to a screening selection to prevent the second mobile electronic device from receiving a notification of the mobile electronic device's proximity to the second mobile electronic device.

In accordance with another feature, an embodiment of the present invention may further include receiving the proximity notification further includes: receiving the proximity notification as a result of an area defined by the first user-selected geofence boundary overlapping with an area defined by a second user-selected geofence boundary associated with the second dog collar.

In accordance with another feature, an embodiment of the present invention may further include the first user-selected geofence boundary is a dynamic geofence boundary based on a real-time current GPS location of the mobile electronic device by being automatically updated in real-time as a result of a movement of the mobile electronic device determined by a GPS receiver of the mobile electronic device.

In accordance with another feature of the present invention, the pet accessory is a dog collar.

Another general aspect may include a pet-related system with: a first pet accessory including a GPS receiver and a processor operably configured to determine if the first pet accessory is at or outside of a first user-selected geofence boundary; and a mobile electronic device communicatively coupled to the first pet accessory, over a network, and including a processor operably configured to execute instructions of a first instance of a pet-related social network application. The instructions of the first instance of the pet-related social network application may include instructions to: display a user interface of the pet-related social network application, the first instance of the pet-related social network application associated with a first social network identity; receive, via the user interface of the pet-related social network application, a user input corresponding to the first user-selected geofence boundary of the first pet accessory; communicate the first user-selected geofence boundary to the first pet accessory; receive a proximity notification of the mobile electronic device's proximity to a second mobile electronic device, the second mobile electronic device communicatively coupled to a second pet accessory, different from the first pet accessory, and the second mobile electronic device operably configured to execute instructions of a second instance of the pet-related social network application, the second instance of the pet-related social network application associated with a second social network identity, different from the first social network identity. Other embodiments of this aspect may include corresponding computer systems, apparatus, and computer programs recorded on one or more computer storage devices, each configured to perform the actions of the methods.

Implementations may include one or more of the following features. In accordance with a further feature of the present invention, the pet accessory is a dog collar.

Although the invention is illustrated and described herein as embodied in a system and method for a pet training system with geofence boundary indicator and software application, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the dog collar. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
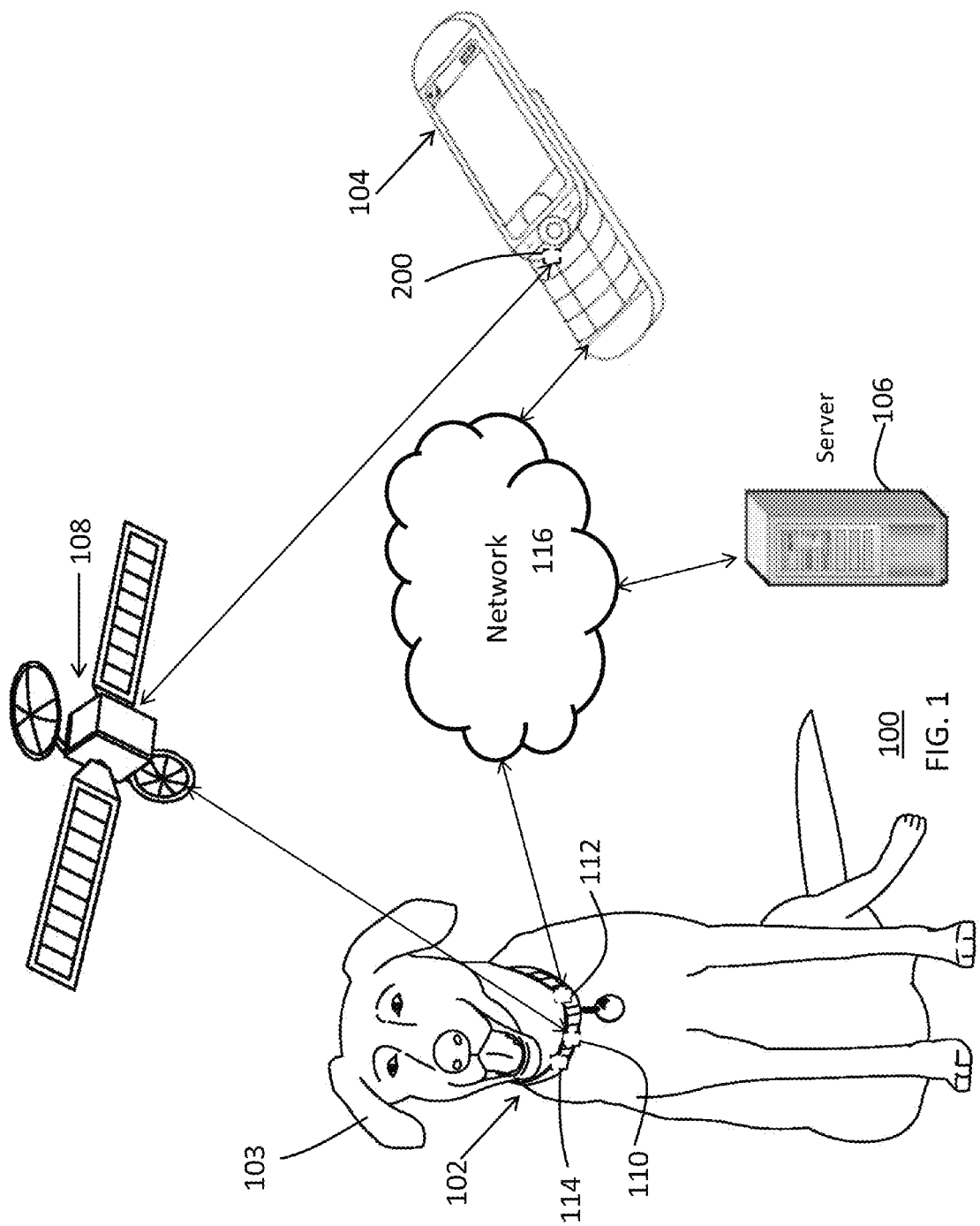
FIG. 1 is a block diagram of an exemplary pet-related social network, including a dog collar, a mobile electronic device, a GPS satellite and a server, communicatively coupled together, over a network, in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient pet-related system and method. Embodiments of the invention provide for a dog collar with a GPS receiver and a processor that is operably configured to determine if the dog collar is at or outside of a user-selected geofence boundary. In addition, embodiments of the invention provide a software application running on an electronic mobile device of an owner/trainer that allows the owner/trainer to select a geofence boundary for the dog collar and also receive a proximity notification of other owners/trainers of dogs with a corresponding dog collar and software application running on their mobile electronic devices. In a further embodiment, user profiles of the dog owners/trainers may be viewable through the software application. In other embodiments, the user-selected geofence boundary can be considered a dynamic geofence boundary that is based on a real-time current location of the mobile electronic device, being automatically updated in real-time as a result of movement of the mobile electronic device. In other words, the user-selected geofence boundary is not a fixed boundary, but rather moves with the owner/trainer's mobile electronic device and may, in some embodiments, be a circle with a constant radius value but whose center is defined by the GPS location of the mobile electronic device. Further embodiments of the invention provide for a warning geofence boundary disposed within the primary geofence boundary such that the warning geofence boundary is associated with a vibration, an audio alert, or other soft correction and the primary geofence boundary is associated with a shock or other more harsh correction stimulus.

Referring now to FIG. 1, one embodiment of the present invention is shown in a block diagram view. FIG. 1 shows several advantageous features of the present invention, but, as will be described below, the invention can be provided in several shapes, sizes, combinations of features and components, and varying numbers and functions of the components. The first example of a pet-related system 100, as shown in FIG. 1, includes a dog collar 102, a mobile electronic device 104, a server 106, and a GPS satellite system 108.

The dog collar 102, as with all dog collars, is operably configured to be worn by a dog 103 around the dog's neck. In one embodiment, the dog collar 102 may be made of a flexible material, such as a leather material, with a buckle, for adjusting the dog collar 102 comfortably around the neck of the dog 103. The dog collar 102 may be provided in various colors and may include stitching or have other decorative patterns thereon. The dog collar 102 may visually and structurally resemble a conventional dog collar; however, the dog collar 102, in accordance with embodiments of the present invention, may also include a GPS receiver 110, a processor 112, and a geofence boundary indicator 114. All or a portion of the components 110, 112 and 114 may be embedded in the flexible dog collar material, or may be otherwise coupled to the dog collar 102.

The GPS receiver 110 receives GPS location information from the GPS satellite system 108 that is communicatively coupled to the GPS receiver 110. The GPS location corresponds to the GPS location of the dog collar 102 and thereby the dog 103 wearing the dog collar 102. In one embodiment, the GPS receiver 110 may transmit GPS location information to the mobile electronic device 104. The processor 112 may receive GPS location information from the GPS receiver 110 and may process such GPS location information to determine whether the dog collar 102 is at or outside of a user-selected geofence boundary, as will be explained in more detail herein below.

As used herein, the term "owner" and "user" will be used in the following description to indicate a person that is responsible for taking care of an animal, such as the animal's owner, trainer, or other individual. The user-selected geofence boundary may be selected by the dog owner via the dog owner's mobile electronic device 104 and subsequently transmitted to the dog collar 102 to be stored in a memory within the processor 112 or a memory communicatively coupled to the processor 112. Advantageously, the user-selected geofence boundary is a dynamic boundary that is based on the real-time, current GPS location of the mobile electronic device 104 that the dog collar 102 is communicatively coupled to, as will be explained in more detail herein below.

The geofence boundary indicator 114 may be formed as a shocking device operable to selectively shock the dog 103 wearing the dog collar 102 for providing a corrective stimulus as a result of the user-selected geofence boundary being met or exceeded by the dog 103. In another embodiment, the geofence boundary indicator 114 may be formed as a speaker that is operable to emit an audible alert to the dog 103 wearing the dog collar 102 for providing a less physically strenuous corrective stimulus as a result of the user-selected geofence boundary being met or exceeded. The audible alert may, in some embodiments, be provided as an alert that is only audible to dogs. In other words, the sound waves may be of a frequency that is audible to dogs and not audible to human beings. The audible alert may, in other embodiments, be provided as an alert that is audible to humans, as well as, dogs. In yet another embodiment, the geofence boundary indicator 114 may be formed as a vibrator that is operably configured to selectively vibrate the dog's 103 neck as a result of the user-selected geofence boundary being met or exceeded. In other embodiments, the geofence boundary indicator 114 may include more than one boundary indicators, such as a shocking device and/or a speaker, as well as, a vibrator. In alternative embodiments, the geofence boundary indicator 114 may be formed so as to provide other types of corrective stimuli for the dog 103.

The mobile electronic device 104 may be formed as a smart phone, or other type of portable electronic device, operably configured to run a software application thereon for executing certain inventive features of the present invention, such as permitting the dog owner to input the user-selected geofence boundary for the dog collar 102.

Figure 2:
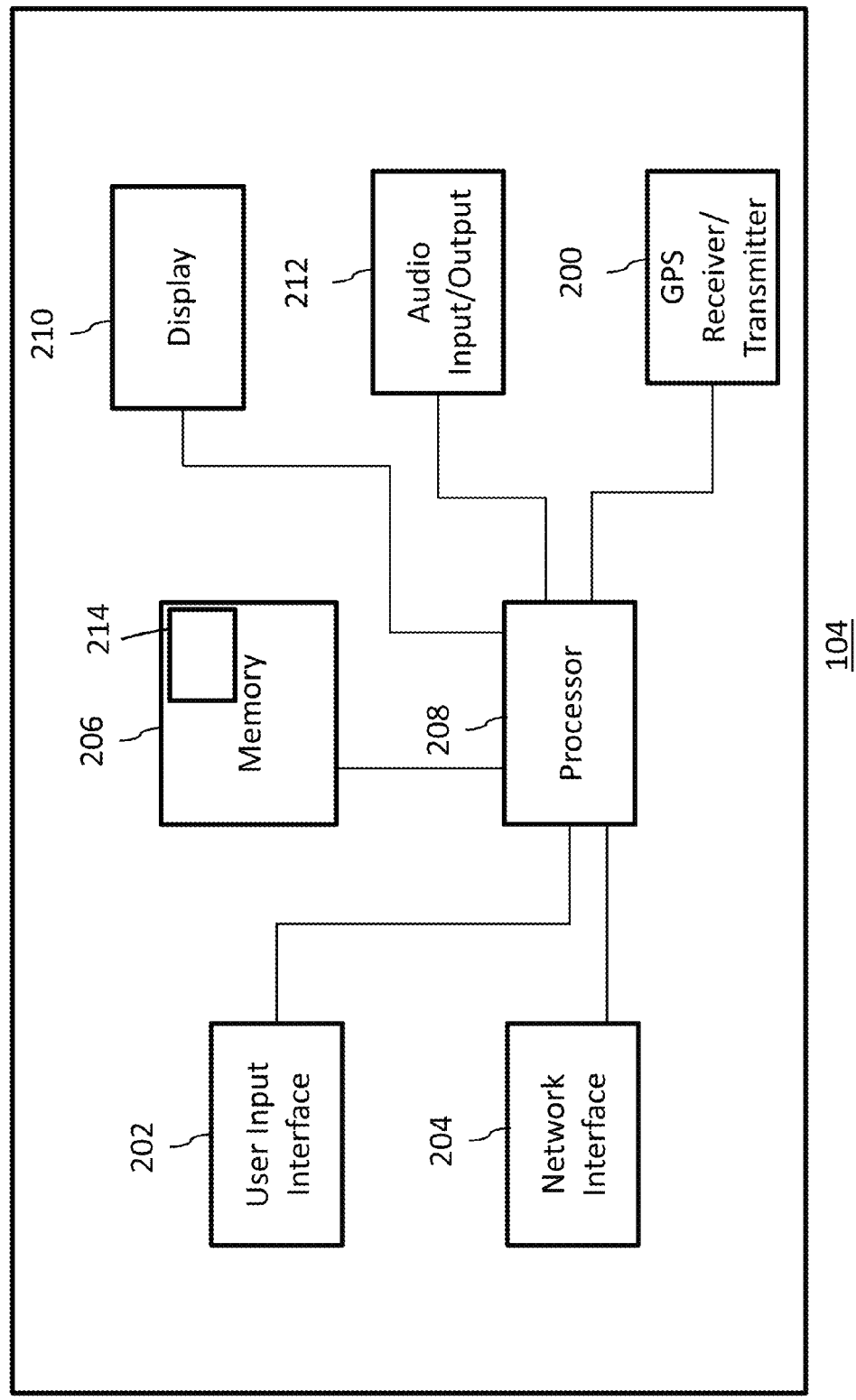
FIG. 2 is a block diagram view of components within an exemplary embodiment of the mobile electronic device of FIG. 1, in accordance with the present invention.

Referring now primarily to FIG. 2, with brief reference to FIG. 1, there is depicted an exemplary mobile electronic device 104 in a block diagram. The exemplary mobile electronic device 104 includes a GPS receiver/transmitter 200, a user input interface 202, a network interface 204, memory 206, a processor 208, a display 210, and an audio input/output 212.

The GPS receiver/transmitter 200 is operable to determine a GPS location of the electronic mobile device 104. The GPS receiver/transmitter 200 may be configured to receive a GPS location of the mobile electronic device 104 from the GPS satellite system 108. The GPS receiver/transmitter 200 receives periodic GPS location information from the GPS satellite system 108 so as to provide a real-time indication of the GPS location of the mobile electronic device 104 and thereby of the owner of the mobile electronic device 104. Advantageously, such GPS location of the mobile electronic device 104 may be used by the processor 208, or by the processor 112, to provide a dynamic geofence boundary that is based on the real-time current GPS location of the mobile electronic device 104. In addition, such GPS location information of the mobile electronic device 104 may also be used by the processor 208 to determine a proximity to other mobile electronic devices in a social networking aspect of embodiments of the present invention, as will be described herein in more detail below. As is generally known, GPS stands for global positioning system.

The user input interface 202 functions to provide a user/dog owner a method of providing inputs to the mobile electronic device 104. The user input interface 202 may also facilitate interaction between the dog owner and the device 104. The user input interface 202 may be a keypad providing a variety of user input operations. For example, the keypad may include alphanumeric keys for allowing entry of alphanumeric information (e.g. a radius or other geofence boundary defining numerical value or selection, telephone numbers, contact information, text, etc.). The user input interface 202 may include special function keys (e.g. a camera shutter button, volume control buttons, back buttons, home button, etc.), navigation and select keys, a pointing device, and the like. Keys, buttons, and/or keypads may be implemented as a touchscreen associated with the display 210. The touchscreen may also provide output or feedback to the user, such as haptic feedback or orientation adjustments of the keypad according to sensor signals received by motion detectors, such as an accelerometer, located within the device 104.

The network interface 204 may include one or more network interface cards (NIC) or a network controller that permits the mobile electronic device 104 to connect to the dog collar 102 and/or the server 106 over a network, such as the network 116 (FIG. 1). Preferably, the connection between the dog collar 102 to the mobile electronic device 104 is unique and independent in that other dog collars with similar hardware features and functionality do not interfere with or confuse communications between the dog collar 102 and the dog owner's mobile electronic device 104. For example, the dog collar 102 may store a unique identification in memory so that the dog collar 102 can be uniquely identified to the dog owner's mobile electronic device 104 to the exclusion of any other dog collars within the vicinity.

In some embodiments, the network interface 204 may include a personal area network (PAN) interface. The PAN interface may provide the capability for the mobile electronic device 104 to network using a short-range communication protocol, for example, a Bluetooth communication protocol. The PAN interface may permit the mobile electronic device 104 to connect wirelessly to the dog collar 102 via a point-to-point connection.

The network interface 204 may also include a local area network (LAN) interface. The LAN interface may be, for example, an interface to a wireless LAN, such as a Wi-Fi network. The LAN may be operably configured to permit the mobile electronic device 104 to connect wirelessly to the dog collar 102 and the server 106 over a long-range network 116, such as the Internet. The range of the LAN interface may generally exceed the range available via the PAN interface. Typically, a connection between two electronic devices via the LAN interface may involve communication through a network router or other intermediary device.

Additionally, the network interface 204 may include the capability to connect to a wide area network (WAN) via a WAN interface. The WAN interface may permit a connection to a cellular mobile communications network. The WAN interface may include communications circuitry, such as an antenna coupled to a radio circuit having a transceiver for transmitting and receiving radio signals via the antenna. The radio circuit may be configured to operate in a mobile communications network, including but not limited to global systems for mobile communications (GSM), code division multiple access (CDMA), wideband CDMA (WCDMA), and the like.

The mobile electronic device 104 may also include a near field communication (NFC) interface. The NFC interface may allow for extremely close range communication at relatively low data rates (e.g., 424 kb/s). The NFC interface may take place via magnetic field induction, allowing the NFC interface to communicate with other NFC interfaces located on other mobile electronic devices or to retrieve information from tags having radio frequency identification (RFID) circuitry. The NFC interface may enable initiation and/or facilitation of data transfer from the mobile electronic device 104 to another electronic device with an extremely close range (e.g. 4 centimeters).

Memory 206 associated with the device 104 may be, for example, one or more buffer, a flash memory, or non-volatile memory, such as random access memory (RAM). The electronic mobile device 104 may also include non-volatile storage. The non-volatile storage may represent any suitable storage medium, such as a hard disk drive or non-volatile memory, such as flash memory.

The processor 208 can be, for example, a central processing unit (CPU), a microcontroller, or a microprocessing device, including a "general purpose" microprocessing device or a special purpose microprocessing device. The processor 208 executes code stored in memory 206 in order to carry out operation/instructions of the mobile electronic device 104. The processor 208 may provide the processing capability to execute an operating system, run various software applications, including the inventive software application of embodiments of the present invention, and provide processing for one or more of the techniques described herein.

The display 210 displays information to the user such as the inventive software application's user interface, various menus, application icons, pull-down menus, and the like. The display 210 may be used to present various images, text, numbers, graphics, or videos to the user, such as photographs, video content, Internet webpages, user profile information, user input fields, social network identities, and the like. The display 210 may be any type of suitable display, such as an liquid-crystal display (LCD), a plasma display, a light-emitting diode (LED) display, or the like.

The mobile electronic device 104 may include audio input and output structures 212, such as a microphone for receiving audio signals from a user and/or a speaker for outputting audio data, such as audio alerts indicating that a geofence boundary is met or exceeded by the dog collar 102, songs, ringtones, video tracks, voice data received by the mobile electronic device 104 over a cellular network, and the like. The mobile electronic device 104 may also include an audio port for connection to peripheral audio input and output structures, such as a headset, or peripheral speakers or microphones.

The server 106 may execute or assist with various techniques described herein. The server 106 may host the pet-related social network application of the present invention and/or store user profile information and other use account information of a plurality of social network identities used in accordance with embodiments of the present invention, as will be discussed herein in more detail below.

Figure 3:
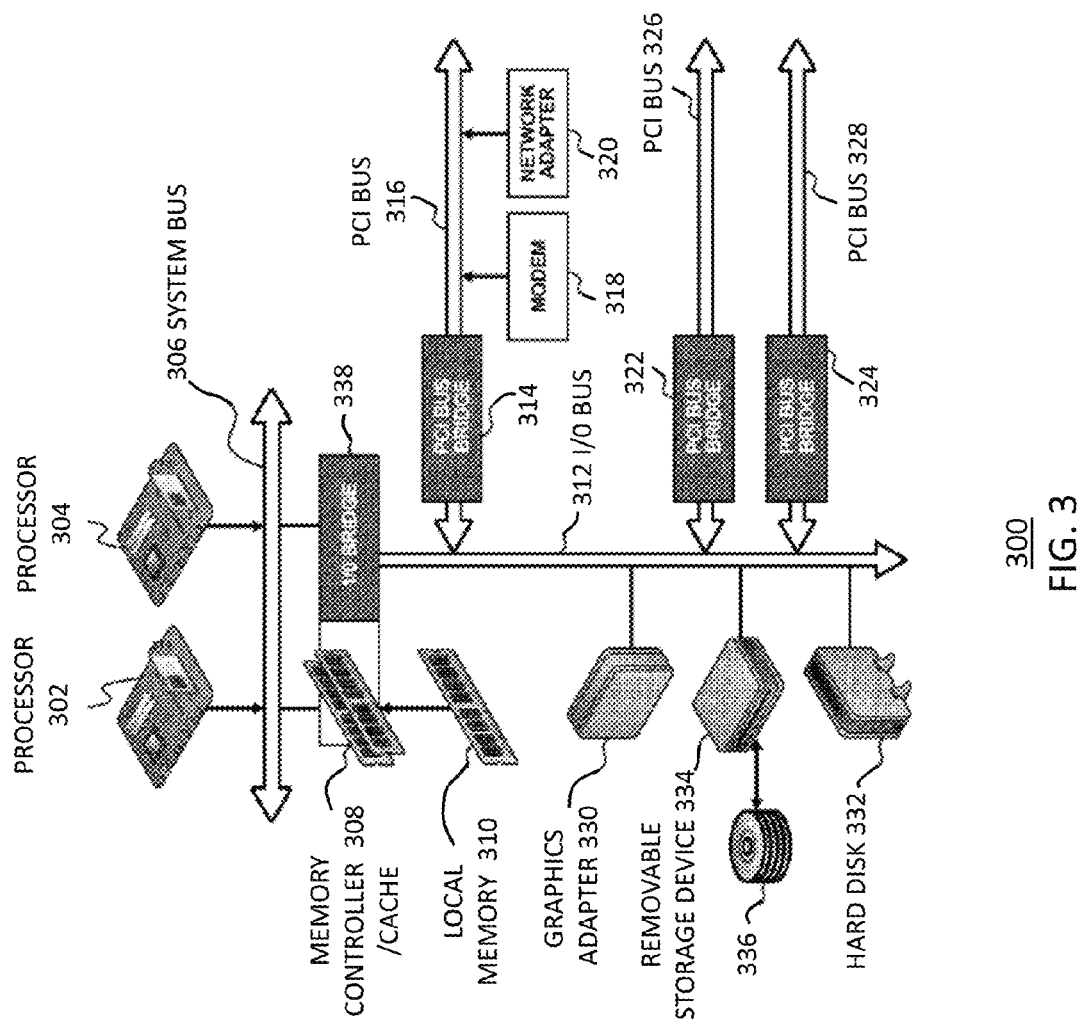
FIG. 3 is a block diagram view of components within an exemplary embodiment of the server of FIG. 1, in accordance with the present invention.

Referring now primarily to FIG. 3, with brief reference to FIG. 1, there is depicted an exemplary data processing system 300 in a block diagram, which may be implemented as the server 106.

The data processing system 300 may be a symmetric multiprocessor (SMP) system including a plurality of processors 302 and 304 connected to system bus 306. Alternatively, a single processor system may be employed. Also, connected to system bus 306 is memory controller/cache 308, which provides an interface to local memory 310. An I/O bus bridge 338 is connected to system bus 306 and provides an interface to I/O bus 312. The memory controller/cache 308 and I/O bus bridge 338 may be integrated as depicted. The processor 302 or 304 in conjunction with memory controller 308 controls what data is stored in memory 310. The processor 302 and/or 304 and memory controller 308 can serve as a data counter for counting the rate of data flow to the memory 310 or from the memory 310 and can also count the total volume of data accessed to or from the memory 310. The processor 302 or 304 can also work in conjunction with any other memory device or storage location.

Peripheral component interconnect (PCI) bus bridge 314 connected to I/O bus 312 provides an interface to PCI local bus 316. A number of modems 318, or wireless cards, may be connected to PCI bus 316. Typical PCI bus implementations will support four PCI expansion slots or add-in connectors. PCI includes, but is not necessarily limited to, PCI-X and PCI Express components. Communications links to the network of computers in FIGS. 1 and 2 may be provided through the modem 318 and network adapter 320 connected to PCI local bus 316 through add-in boards.

Additional PCI bus bridges 322 and 324 provide interfaces for additional PCI buses 326 and 328, from which additional modems or network adapters may be supported. In this manner, the data processing system 300 allows connections to a multiple network of computers. A graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The processes explained in detail below can be embodied in a computer program. Computer programs (also called computer control logic) are stored in memory such as main memory 310, removable storage drive 334, removable media 336, hard disk 332, and signals. Such computer programs, when executed, enable the computer system to perform the features of the present invention as discussed herein. In particular, the computer programs, when executed, cause the processor 302 and/or 304 to perform the features of the pet-related system 100.

In this document, the terms "computer program medium," "computer usable medium," and "computer readable medium" are used to generally refer to media such as main memory 310, removable storage drive 334, removable media 336, hard disk 332, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer/programming instructions, between computer systems. Furthermore, the computer readable medium may comprise computer readable information in a transitory state medium such as a network link and/or a network interface, including a wired or wireless network, that allows a computer to read such computer readable information.

Referring again primarily to FIG. 1, the GPS satellite system 108, as is generally known, provides GPS location and time information across the Earth where there is an unobstructed line of sight to at least three GPS satellites within the GPS satellite system 108. Generally, the GPS satellite system 108 provides positioning capabilities to users across the Earth and transmits the GPS location and time information to GPS receivers.

The network 116 may include, for example, a long-range network, such as the Internet and/or a cellular network, or may, in some embodiments, include a short-range point-to-point network, such as a Bluetooth network.

Figure 4:
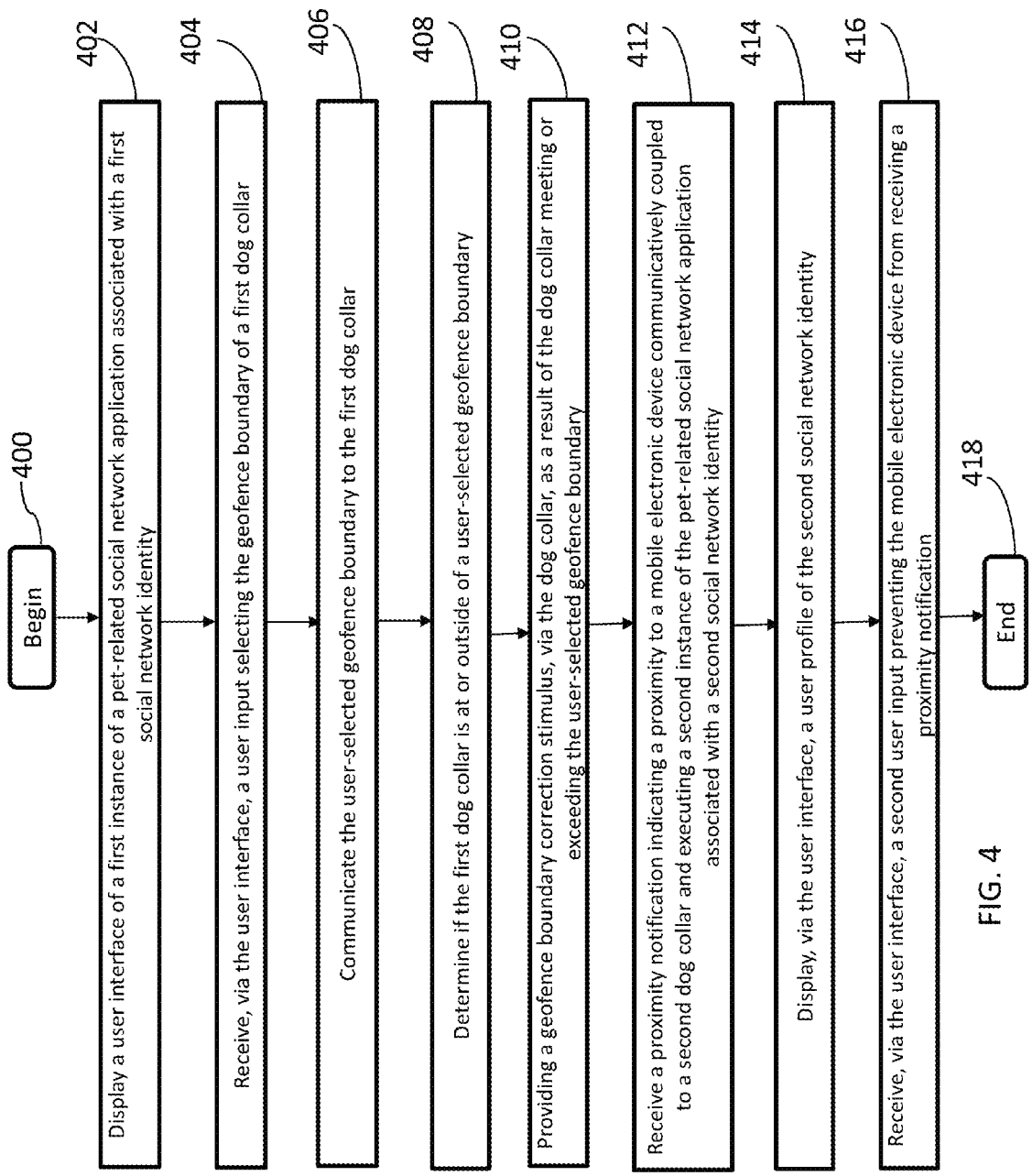
FIG. 4 is a flow diagram of an exemplary pet social network and geofence boundary enforcement method, in accordance with an embodiment of the present invention.

Having described the network hardware components and system architecture for embodiments of the pet-related system 100, the inventive processes will now be described with reference to the process flow chart of FIG. 4 in conjunction with FIGS. 1-3 and 5-7. Although FIG. 4 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 4 for the sake of brevity.

Figure 6:
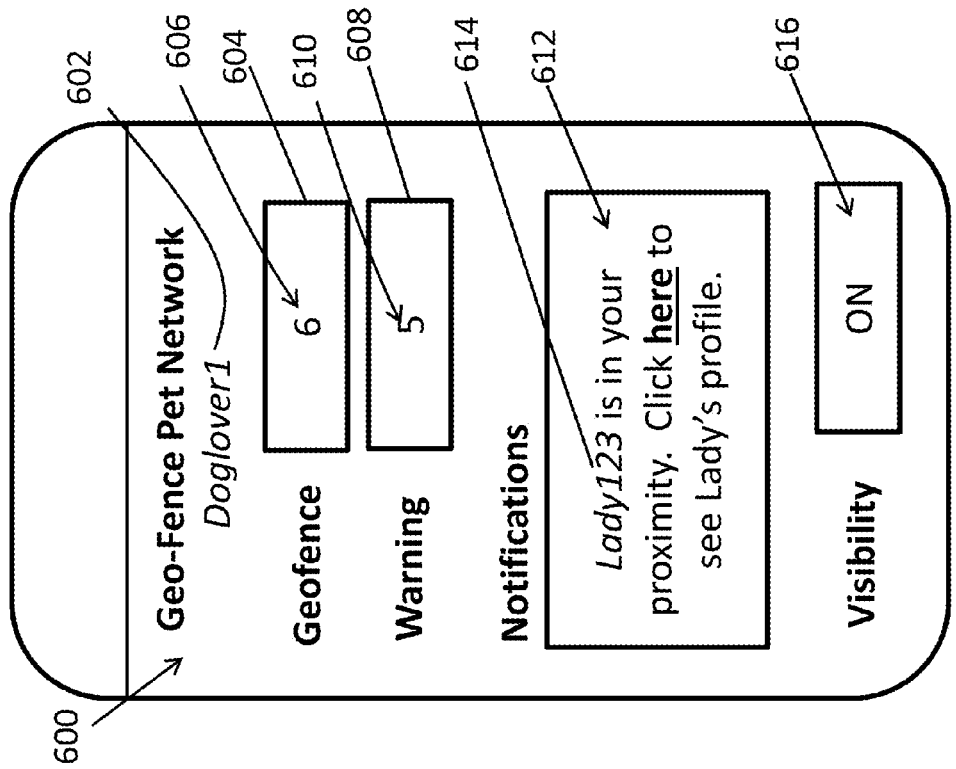
FIG. 6 is a block diagram of a computer display of the mobile electronic device of FIG. 1, illustrating a screenshot of an exemplary home page of a software application running on the mobile electronic device, in accordance with the present invention.

The process may begin at step 400 and may immediately proceed to step 402, where a user interface 600, shown in FIG. 6, may be displayed on the display 210 of the mobile electronic device 104. The user interface 600 may be a user interface of a first instance of a pet-related social network application 214 stored in the memory 206 of the mobile electronic device 104 and executed by the processor 208. The first instance of the pet-related social network application 214 may be associated with a first social network identity 602. In other words, the user may be logged-in to his/her user account, hosted and managed by the server 106, the user account being associated with the first social network identity 602 such that the user can access and view his/her account information, profile, messages, features, and the like, which may be stored at the server 106. The "user interface" is intended to indicate the graphical user interface, which may include one or more web/app pages, displayed to the user and through which the user can interact with the software application 214 by providing user inputs via the user interface, and, more specifically, by providing user inputs into the user input interface 202 (e.g., touchscreen, keypad).

In one embodiment, the user interface 600 may display the social network identity 602. The user interface 600 may also display user account profile information associated with the social network identity 602. The user interface 600 may also include various menus, icons, images, text, graphics, user input fields, and the like. In one embodiment, in order for the user to access the user account information associated with the first social network identity 602, the user may be required to input a unique username and password into a login page of the user interface 600.

Figure 5:
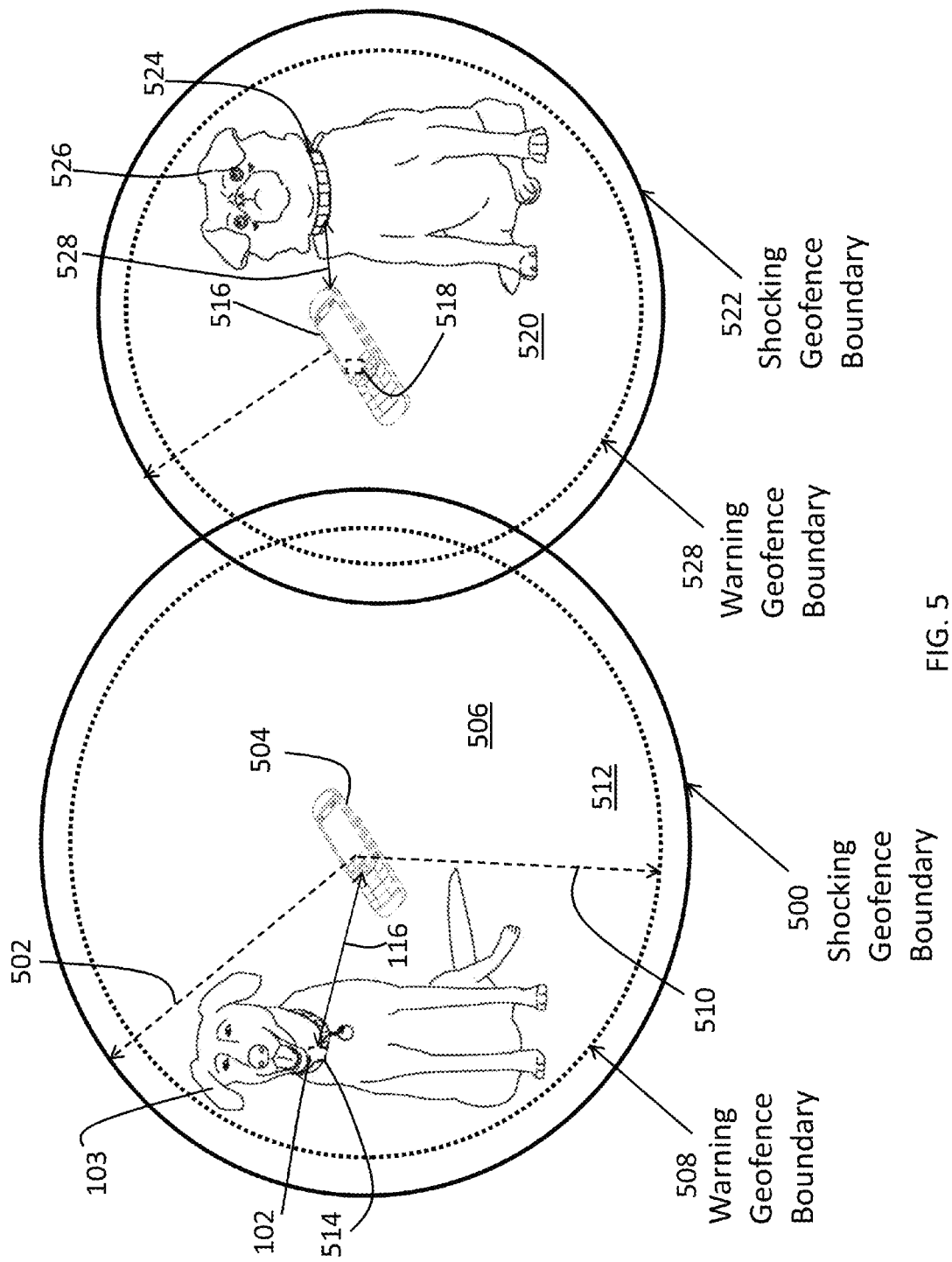
FIG. 5 is a block diagram the mobile electronic device and the dog collar of FIG. 1, in addition to a second mobile electronic device and a second dog collar, communicatively coupled over the network, illustrating primary and secondary geofence boundaries and a geofence boundary overlap feature, in accordance with the present invention.

In step 404, a user input corresponding to a geofence boundary 500, shown in FIG. 5, of the dog collar 102 may be received by the processor 208 of the mobile electronic device 104 via the user interface 600. In other words, the user interface 600 may include, for example, a geofence user input field 604 that allows the user to input a value 606 corresponding to the user-selected geofence boundary 500. In one embodiment, the value 606 may represent a radius 502 of a circle that forms the geofence boundary 500. In one embodiment, the mobile electronic device 104 may be considered a center 504 of the circle/geofence boundary 500. The user-selected geofence boundary 500 may be considered a dynamic boundary, with the circle moving automatically as the mobile electronic device 104 moves such that the center 504 remains the mobile electronic device 104 and the radius 502 remains as indicated by the user input value 606. If desired, the user may change the radius 502 by inputting a different value in the geofence user input field 604 so as to increase or reduce an area 506 defined by the user-selected geofence boundary 500. Stated another way, the first user-selected geofence boundary 500 may be considered a dynamic geofence boundary by being based on a real-time current GPS location of the mobile electronic device 104 and by being automatically updated in real-time as a result of movement of the mobile electronic device 104, as determined by the GPS receiver 200 of the mobile electronic device 104. Advantageously, the user-selected geofence boundary 500 is useful to restrict the dog's 103 movement to a moving object, namely the user's mobile electronic device 104, which is an improvement over existing invisible fences that are designed for use in a stationary/fixed environment.

In other embodiments, the value 606 may represent other dimensions associated with the user-selected geofence boundary 500, such as, for example, a diameter, a length, a width, and the like, and can be placed in any geographic location, i.e., not centered on the user's mobile electronic device 104. In another embodiment, the user-selected geofence boundary 500 may be a pre-programmed geographic area not centered on the user's mobile electronic device 104, such as, for example, a field near the user's favorite coffee house that the user walks to every morning, or a dog park where the user may move, but the user-selected geofence boundary 500 remains the same. In other embodiments, the user-selected geofence boundary 500 may be determined by a default value, which may be changed by the user if desired. In yet another embodiment, rather than the geofence user input field 604, the user interface 600 may provide other methods and apparatuses for the user to select the geofence boundary 500 such as, for example, a drop down menu of predetermined values corresponding to the user-selected geofence boundary 500, or a graphical selection, such as, for example a graphical representation of a circle that can be dragged larger or smaller by the user. In yet other embodiments, the user interface 600 may provide yet other methods and apparatuses for permitting the user to select and change the geofence boundary 500.

In one embodiment, the processor 208 of the mobile electronic device 104 may use the value 606 input by the user and the current GPS location of the mobile electronic device 104, as determined by the GPS receiver 200, to calculate the user-selected geofence boundary 500. More specifically, in one embodiment, the processor 208 may determine a range of GPS coordinates (e.g., latitude and longitude range) that are considered to be at or within the user-selected geofence boundary 500.

In step 406, the mobile electronic device 104 may communicate the user-selected geofence boundary 500 to the dog collar 102. In one embodiment, the mobile electronic device 104 may transmit the range of GPS coordinates calculated by the processor 208 of the mobile electronic device 104, which are considered to be at or within the user-selected geofence boundary 500. In another embodiment, the mobile electronic device may transmit the user-input value 606 and the current GPS location of the mobile electronic device 104 so that the processor 112 on the dog collar 102 may perform the calculations to determine the GPS coordinates corresponding to the user-selected geofence boundary 500. In yet other embodiments, the mobile electronic device 104 may transmit other data values indicating the user-selected geofence boundary 500 to the dog collar 102.

Such communication may occur over the network 116 and may be communicated over, for example, a Bluetooth® network, the Internet, or another short or long-range wireless network. In one embodiment, the mobile electronic device 104 may store the user-selected geofence boundary 500 in the memory 206 and may periodically and continuously transmit the current user-selected geofence boundary 500 at equally spaced-apart intervals so that the dog collar 102 can be updated with the most current user-selected geofence boundary 500 parameters in real-time. In another embodiment, the mobile electronic device 104 may asynchronously transmit the user-selected geofence boundary 500 to the dog collar 102 responsive to the user inputting a new geofence boundary 500 value 606. In yet other embodiments, the mobile electronic device 104 may communicate the user-selected geofence boundary 500 to the dog collar 102 in other ways.

In step 408, it may be determined whether the dog collar 102 is at or outside of the first user-selected geofence boundary 500. In one embodiment, the processor 112 and the GPS receiver 110 included in the first dog collar 102 may determine if the dog collar 102 is at or outside of the first user-selected geofence boundary 500. More specifically, in one embodiment, the processor 112 may access the first user-selected geofence boundary 500 (which may be stored in a memory on the dog collar 102 either within the processor 112 itself or otherwise communicatively coupled thereto), access a current GPS location of the dog collar (as determined by the GPS receiver 110 of the dog collar 102), and may compare the first user-selected geofence boundary 500 to the GPS location of the dog collar 102 to determine if the GPS location of the dog collar 102 is at or outside of the first user-selected geofence boundary 500. The correction stimulus may be configured to be activated by the dog collar 102 being disposed at and outside the first user-selected geofence boundary 500, or, alternatively, may be configured to be activated by the dog collar 102 being outside of the first user-selected geofence boundary 500 but not activated if the dog collar 102 is merely at the boundary 500.

In one embodiment, the user interface 600 may be provided with a warning geofence user input field 608 that allows the user to input a value 610 corresponding to a user-selected warning geofence boundary 508 associated with the dog collar 102. The user-selected warning geofence boundary 508 may exist simultaneously with the user-selected geofence boundary 500 and should define an area that is smaller than and disposed within the user-selected geofence boundary 500 so as to permit the dog 103 to be provided with a soft warning (e.g., an audio alert or vibration), prior to a primary stimulus (e.g., a shock). In other words, the user-selected geofence warning boundary 508 is disposed simultaneously with and within the primary user-selected geofence boundary 500 so as to provide a soft warning prior to the dog collar 102 providing a more harsh stimulus. This feature is particularly useful for the dynamic geofence boundary feature of embodiments of the present invention so as not to overcorrect the dog 103. Stated another way, the warning geofence boundary 508 permits the dog 103 to be gently warned prior to being shocked, as it is much harder for the dog 103 to learn where the geofence boundary 500 is located since it is constantly moving with the movement of the mobile electronic device 104. This is similar to a tug on a leash, which eventually trains the dog to stay close the owner.

As with the user-selected geofence boundary 500, the value 610 representing the user-selected warning geofence boundary 508 may represent a radius 510 of a circle that forms the warning geofence boundary 508. The mobile electronic device 104 may be considered the center 504 of the circle/warning geofence boundary 508. The user-selected warning geofence boundary 508 may also be considered a dynamic boundary, with the circle moving automatically as the mobile electronic device 104 moves such that the center 504 remains the mobile electronic device 104 and the radius 510 remains as indicated by the user input value 610. If desired, the user may change the radius 510 by inputting a different value in the warning geofence user input field 608 so as to increase or reduce an area 512 defined by the user-selected warning geofence boundary 508. Stated another way, the warning geofence boundary 508 may be considered a dynamic geofence boundary by being based on a real-time current GPS location of the mobile electronic device 104 and by being automatically updated in real-time as a result of movement of the mobile electronic device 104, as determined by the GPS receiver 200 of the mobile electronic device 104.

In other embodiments, the warning boundary value 610 may represent other dimensions associated with the user-selected warning geofence boundary 508, such as, for example, a diameter, a length, a width, and the like. In other embodiments, the user-selected warning geofence boundary 508 may be determined by a default value, which may be changed by the user if desired. In yet another embodiment, rather than the warning geofence user input field 608, the user interface 600 may provide other methods and apparatuses for the user to select the warning geofence boundary 508 such as, for example, a drop down menu of predetermined values corresponding to the user-selected warning geofence boundary 508, or a graphical selection, such as, for example a graphical representation of a circle that can be dragged larger or smaller by the user. In yet other embodiments, the user interface 600 may provide yet other methods and apparatuses for permitting the user to select and change the warning geofence boundary 508.

In one embodiment, the processor 208 of the mobile electronic device 104 may use the value 610 input by the user and the current GPS location of the mobile electronic device 104, as determined by the GPS receiver 200, to calculate the user-selected warning geofence boundary 508. More specifically, in one embodiment, the processor 208 may determine a range of GPS coordinates (e.g., latitude and longitude range) that are considered to be at or within the user-selected warning geofence boundary 508.

The mobile electronic device 104 may communicate the user-selected warning geofence boundary 508 to the dog collar 102. In one embodiment, the mobile electronic device 104 may transmit the range of GPS coordinates calculated by the processor 208 of the mobile electronic device 104, which are considered to be at or within the user-selected warning geofence boundary 508. In another embodiment, the mobile electronic device 104 may transmit the user-input warning value 610 and the current GPS location of the mobile electronic device 104 so that the processor 112 on the dog collar 102 may perform the calculations to determine the GPS coordinates corresponding to the user-selected warning geofence boundary 508. In yet other embodiments, the mobile electronic device 104 may transmit other data values indicating the user-selected warning geofence boundary 508 to the dog collar 102.

Such communication may occur over the network 116 and may be communicated over, for example, a Bluetooth® network, the Internet, or another short or long-range wireless network. In one embodiment, the mobile electronic device 104 may store the user-selected geofence boundary 500 in the memory 206 and may periodically and continuously transmit the current user-selected warning geofence boundary 508 at equally spaced-apart intervals so that the dog collar 102 can be updated with the most current user-selected warning geofence boundary 508 parameters in real-time. In another embodiment, the mobile electronic device 104 may asynchronously transmit the user-selected warning geofence boundary 508 to the dog collar 102 responsive to the user inputting a new warning geofence boundary 508 value 610. In yet other embodiments, the mobile electronic device 104 may communicate the user-selected warning geofence boundary 508 to the dog collar 102 in other ways.

The inventive method may also include whether the dog collar 102 is at or outside of the warning geofence boundary 508. In one embodiment, the processor 112 and the GPS receiver 110 included in the first dog collar 102 may determine if the dog collar 102 is at or outside of the first warning geofence boundary 508. More specifically, in one embodiment, the processor 112 may access the first warning geofence boundary 508 (which may be stored in a memory on the dog collar 102 either within the processor 112 itself or otherwise communicatively coupled thereto), access a current GPS location of the dog collar (as determined by the GPS receiver 110 of the dog collar 102), and may compare the warning geofence boundary 508 to the GPS location of the dog collar 102 to determine if the GPS location of the dog collar 102 is at or outside of the warning geofence boundary 508. The soft warning may be configured to be activated by the dog collar 102 being disposed at and outside the warning geofence boundary 508, or, alternatively, may be configured to be activated by the dog collar 102 being outside of the warning geofence boundary 508 but not activated if the dog collar 102 is merely at the boundary 508.

As is apparent from the description above, the primary geofence boundary 500 and the warning geofence boundary 508 may be configured similarly with one another, except that the warning geofence boundary 508 is configured to be smaller than and disposed within the primary geofence boundary 500 and is also configured to activate a softer warning stimulus than a stimulus activated by the primary geofence boundary 500 being met or exceeded.

At step 410, as a result of the dog collar 102 meeting or exceeding the user-selected geofence boundary 500, the dog collar 102 may provide a geofence boundary correction stimulus. In one embodiment, the dog collar 102 may be provided with the geofence boundary indicator 114, which may be formed as a shocking device. The shocking device may be configured to deliver electrical shocks or pulses of varying intensity and duration to the dog's 103 neck as a correction stimuli. In one embodiment, the shocking device may include one or more electrodes for delivering an electrical shock, a power source, and circuitry configured to control and activate delivery of the electrical shock to the dog 103. In other embodiments, the shocking device may include additional components.

In one embodiment, the user interface 600 may be provided with controls to permit the user to select an intensity and duration of the shock to be delivered to the dog 103. In another embodiment, the geofence boundary indicator 114 may be formed as a speaker or a vibrator operable to emit a sound/audible warning or a vibration, respectively, as a result of the dog collar 102 being at or outside of the user-selected warning geofence boundary 508. The audible warning may be configured to be provided so as to be audible to human and dogs, or may be configured to be audible to dogs only. In one embodiment, the user interface 600 may be provided with controls or a menu to select from among a plurality of geofence boundary indicators 114. Accordingly, dog owners of various opinions about correction stimuli and owning dogs of various temperaments can select which of the plurality of boundary indicators 114 is desired for a particular dog.

In a further embodiment, incorporating the warning boundary 508, the dog collar 102 may be provided with a geofence boundary warning indicator 514, in addition to the primary geofence boundary indicator 114. The geofence boundary warning indicator 514 is preferably formed as a device that is operable to provide a softer stimulus than a stimulus provided by the primary geofence boundary warning indicator 114. In one embodiment, the geofence boundary warning indicator 514 may be formed as a speaker or a vibrator operable to emit a sound/audible warning or a vibration, respectively, as a result of the dog collar 102 being at or outside of the user-selected warning geofence boundary 508. The audible warning may be configured so as to be audible to humans and dogs, or may be configured to be audible to dogs and not humans. In one embodiment, the user interface 600 may be provided with controls or a menu to select from among a plurality of geofence boundary warning indicators 514. Accordingly, dog owners of various opinions about correction stimuli and owning dogs of various temperaments can select which of the plurality of boundary warning indicators 514 is desired for a particular dog.

In step 412, a proximity notification 612 may be received by the processor 208 of the mobile electronic device 104, which may also be displayed to the user on the display 210 via the user interface 600, as depicted in FIG. 6. The proximity notification 612 may be displayed to the user via the user interface 600 as a result of the mobile electronic device 104 being in proximity to a second mobile electronic device 516 that is running a second instance of the pet-related social network application 518 simultaneously with the mobile electronic device 104 running the first instance of the pet-related social network application 214.

The proximity notification 612 may be formed as a text notification displayed on the display 210 of the mobile electronic device 104 via the user interface 600. In a further embodiment, the proximity notification 612 may include an audio alert and/or a vibration.

The second instance of the pet-related social network application 518 may be associated with a second social network identity 614, which may be displayed on the display 210 via the user interface 600 in conjunction with the proximity notification 612. The second social network identity 614 may be associated with a user account of the owner/user of the second mobile electronic device 516, which may be hosted and managed by the server 106, as with the user account being associated with the first social network identity 602. The server 106 may continuously receive the GPS locations of the mobile electronic devices 516 and 104 and may be operably configured to determine if the mobile electronic devices 516 and 104 are within a predetermined proximity with one another. More specifically, the instances of the pet-related social network application 518 and 214, running on the respective mobile electronic devices 516 and 104 may be configured to automatically and continuously transmit the GPS locations/coordinates of the devices 516 and 104 to the server 106. The server 106 can then determine the proximity of the devices 516 and 104 to one another for purposes of providing proximity notifications 612 to the devices 516 and 104.

The pre-determined proximity can be a default distance value stored at the server 106 and/or stored at the respective mobile electronic devices 516 and 104. In another embodiment, the pre-determined proximity can be a user-selected distance value that the user may select via the user interface 600. In another embodiment, the proximity notification 612 may be received as a result of the area 506 defined by the user-selected geofence boundary 500 overlapping with an area 520 defined by a second user-selected geofence boundary 522 associated with a second dog collar 524, as shown in FIG. 5, worn on a second dog 526 different from the first dog 103. The second dog 526 may be owned by the user of the second mobile electronic device 516. The second dog collar 524 may also be associated with a second user-selected warning geofence boundary 528 that may produce a warning stimulus, e.g., audio or vibration, as a result of the second dog collar 524 being at or outside of the second user-selected warning geofence boundary 528, prior to the second dog collar 524 exceeding the second primary user-selected geofence boundary 522.

The second user-selected geofence boundaries 522 and 528 may each be a geofence boundary selected by the user of the second mobile electronic device 516, similar to the methods, apparatuses and embodiments discussed herein above regarding the first dog collar 102 and the first mobile electronic device 104. Accordingly, for the sake of brevity, the description will not be repeated here with respect to the second user-selected geofence boundaries 522 and 528, but should be understood to also apply to the second user-selected geofence boundaries 522 and 528.

The second dog collar 524 may be identical or similar to the first dog collar 102, except that the second dog collar 524 is worn on the second dog 526 (not the first dog 103) and is operably configured to send and receive communications to the second mobile electronic device 516 (and not the first mobile electronic device 104). Thus, the description herein above with respect to the first dog collar 102 may be considered to also apply to the second dog collar 524.

In one embodiment, the network 116 over which the dog collar 102 and the mobile electronic device 104 communicates with one another, in accordance with the present invention, may be distinguishable from a network 528 over which the second dog collar 524 and the second mobile electronic device 516 communicates with one another. In other words, the communications channel between dog collar and respective mobile electronic device should be configured to be distinct such that when users cross paths, communications from the dog collars do not get transmitted to the wrong mobile electronic device and communications from the mobile electronic device do not get transmitted to the wrong dog collar. In another embodiment, the dog collar 102, 524 may be paired over a Bluetooth® network with the respective mobile electronic device 104, 516. In one embodiment, the network 116 and the network 528 may be the same network, such as, the Internet, and each dog collar 102, 524 may store a unique identification (e.g., a MAC address, IP address, and/or other alphanumeric code) in a memory of the dog collar 102, 524 that may be transmitted with all messages and verified by the receiving mobile electronic device 104, 516 over the Internet. In yet other embodiments, the dog collar 102, 524 may be communicatively coupled to the respective mobile electronic device 104, 516 by other methods and apparatuses.

Figure 7:
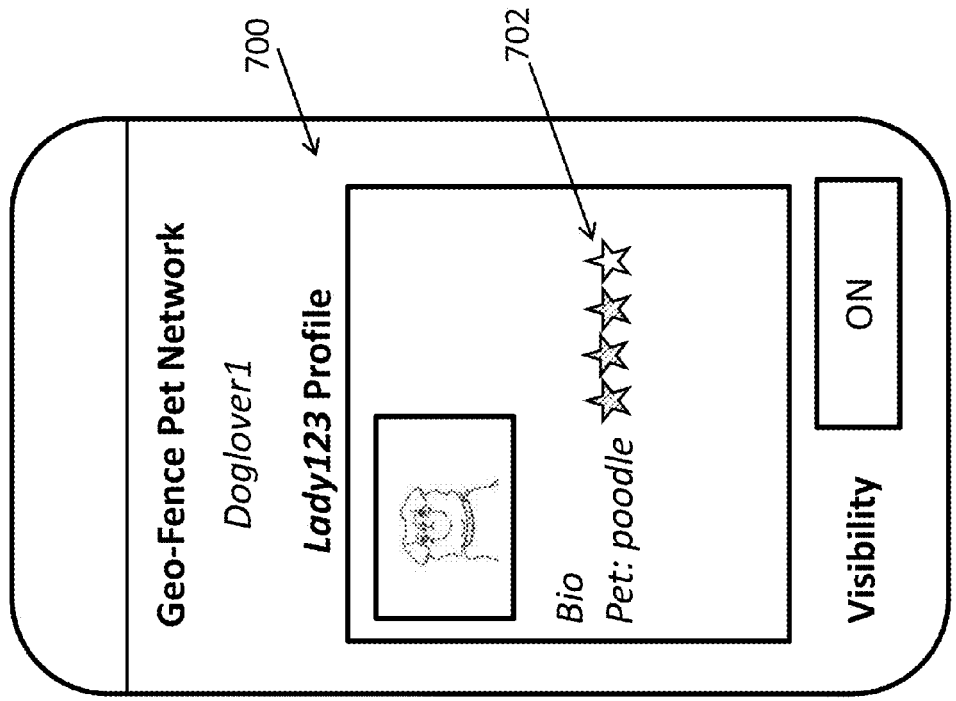
FIG. 7 is a block diagram of the computer display of the mobile electronic device of FIG. 1, illustrating a screenshot of an exemplary profile page of the software application running on the mobile electronic device, in accordance with the present invention.

In step 414, a user profile 700 associated with the second social network identity 614 may be displayed on the display 210 of the mobile electronic device 104, as can be seen in FIG. 7. In one embodiment, the user profile 700 of the second social network identity 614 may be displayed as a result of receiving the proximity notification of the mobile electronic device's 104 proximity to the second mobile electronic device 516. Accordingly, the user of the mobile electronic device 104 may review the user profile 700 of the second social network identity 614 prior to initiating contact with the user of the second mobile electronic device 516. The user profile 700 may include personal information associated with the user of the second mobile electronic device 516, as well as, information about the user's dog 526. The user profile 700 may include personal photographs, video, biographical and/or demographical information, pet information, text, location information, links to the user's friends, likes/dislikes, posts, and the like.

In one embodiment, the user profile 700 may include a pet rating system 702 in which other users having a social network identity associated with the pet-related system 100 may rate the user's pet. For example, such other users may rate the user's pet, after having encountered the pet, in connection with various characteristics, such as, for example, pet friendliness, likeability, discipline, physical traits, grooming, etc. Accordingly, users can decide, based on the pet rating, whether their respective pets would be a good match for one another. In the exemplary embodiment, the pet rating system 702 is provided as a 4-star system in which 4 stars is the highest rating and 0 stars is the lowest rating. In other embodiments, the pet rating system 702 may be provided in other forms, such as, for example, user likes/dislikes, a numerical score between a range of 1-10 for various pet characteristics, and the like.

The pet-related social network application 214 may provide other features via the user interface 600, such as, for example, messaging between users, live chats between users, a GPS map showing the locations of other users via graphical icons on the map, etc.

In step 416, a user input corresponding to a screening selection 616 may be received by the processor 208 of the mobile electronic device 104 via the user interface 600. The screening selection 616 may be configured to selectively prevent the second mobile electronic device 516 from receiving a notification of the mobile electronic device's 104 proximity to the second mobile electronic device 516. In another embodiment, the screening selection 616 may be configured to selectively prevent the second mobile electronic device 516 from being able to view the user profile associated with the first social network identity 602. In a further embodiment, the screening selection 616 may be configured to selectively prevent the second mobile electronic device 516 from sending messages or other communications to the user account associated with the first social network identity 602. In yet a further embodiment, the screening selection 616 may be configured to selectively prevent the second social network identity 614 from being able to view the first social network identity 602. Advantageously, the screening selection 616 may permit users to render their social network accounts invisible to, or otherwise prevent communications with users that they do not desire to initiate and/or continue contact with via the pet-related social network application 214.

In one embodiment, the screening selection 616 may be formed as an icon or button 616 provided via the user interface 600. The screening selection button 616 may be selected/depressed by the user in order to prevent visibility of the first social network identity 602 by the user account of the second social network identity 614. In other embodiments, the screening selection 616 may be formed as other user input features, such as, for example, a drop-down menu, a toggle button, a check box, etc. Preferably, the screening selection 616 is provided on the display 210 of the mobile electronic device 104 via the user interface 600.

In yet other embodiments, the user associated with the second social network identity 614 may also screen out the user associated with the first social network identity 602. In other words, the user associated with the second social network identity 614 may also be provided with the screening selection 616 so as to selectively prevent visibility of the second social network identity 614 to the user account associated with the first social network identity 602. Accordingly, in such embodiments, users of the inventive pet-related social network system and method can control their visibility to other users and maintain privacy relative to some, or all other users. The process may immediately end at step 418.

Although the present invention has been primarily described with reference to dogs, dog collars, and dog owners, it should be understood that other embodiments may be implemented with other types of pets and pet accessories, such as, for example, cats and cat collars, etc.

A novel and efficient pet-related system and method has been disclosed that provides for a dog collar with a GPS receiver and a processor that is operably configured to determine if the dog collar is at or outside of a user-selected geofence boundary. In addition, embodiments of the invention provide a software application running on an electronic mobile device of an owner/trainer that allows the owner/trainer to select a geofence boundary for the dog collar and also receive a proximity notification of other owners/trainers of dogs with a corresponding dog collar and software application running on their mobile electronic devices. In a further embodiment, user profiles of the dog owners/trainers may be viewable through the software application. In other embodiments, the user-selected geofence boundary can be considered a dynamic geofence boundary that is based on a real-time current location of the mobile electronic device, being automatically updated in real-time as a result of movement of the mobile electronic device. In other words, the user-selected geofence boundary is not a fixed boundary, but rather moves with the owner/trainer's mobile electronic device and may, in some embodiments, be a circle with a constant radius value but whose center is defined by the GPS location of the mobile electronic device. Further embodiments of the invention provide for a warning geofence boundary disposed within the primary geofence boundary such that the warning geofence boundary is associated with a vibration or an audio alert and the primary geofence boundary is associated with a shock or other more harsh correction stimuli.

What is claimed is:

1. A pet-related system comprising:
    a first dog collar including a GPS receiver and a processor operably configured to determine if the first dog collar is at or outside of a first user-selected geofence boundary; and
    a mobile electronic device communicatively coupled to the first dog collar and including a processor operably configured to execute instructions of a first instance of a pet-related social network application to:
        display a user interface of the pet-related social network application, the first instance of the pet-related social network application associated with a first social network identity;
        receive, via the user interface of the pet-related social network application, a user input corresponding to the first user-selected geofence boundary of the first dog collar;
        broadcast the first user-selected geofence boundary to the first dog collar; and
        receive a proximity notification of the mobile electronic device's proximity to a second mobile electronic device, the second mobile electronic device communicatively coupled to a second dog collar, different from the first dog collar, and the second mobile electronic device operably configured to execute instructions of a second instance of the pet-related social network application, the second instance of the pet-related social network application associated with a second social network identity, different from the first social network identity.

2. The system in accordance with claim 1, wherein the processor is further operably configured to execute instructions of the first instance of the pet-related social network application to:
    receive, via the user interface of the pet-related social network application, a second user input corresponding to a second geofence warning boundary different from the first user-selected geofence boundary, the second geofence warning boundary disposed simultaneously with and within the first user-selected geofence boundary so as to provide a warning prior to the first dog collar being at or outside of the first user-selected geofence boundary; and
    as a result of the second user input, communicate the second geofence warning boundary to the first dog collar, the processor of the first dog collar operably configured to determine if the first dog collar is at or outside of the second geofence warning boundary.

3. The system in accordance with claim 2, wherein:
    the first dog collar includes a shocking device operably configured to shock a dog wearing the first dog collar as a result of the processor determining that the first dog collar is at or outside of the user-selected geofence boundary.

4. The system in accordance with claim 3, wherein:
the first dog collar includes a warning indicator that is formed as at least one of a vibrator and a speaker operably configured to at least one of vibrate, via the vibrator, and emit, via the speaker, an audible warning to the dog wearing the first dog collar, prior to shocking the dog, as a result of the processor determining that the first dog collar is at or outside of the second geofence warning boundary.

5. The system in accordance with claim 1, wherein:
the first dog collar is paired to the mobile electronic device, to the exclusion of the second mobile electronic device; and
the second dog collar is paired to the second mobile electronic device, to the exclusion of the first mobile electronic device.

6. The system in accordance with claim 1, wherein the processor is further operably configured to execute instructions of the first instance of the pet-related social network application to:
receive, via the user interface of the pet-related social network application, a second user input corresponding to a screening selection to prevent the second mobile electronic device from receiving a notification of the mobile electronic device's proximity to the second mobile electronic device.

7. The system in accordance with claim 1, wherein the processor is further operably configured to execute instructions of the first instance of the pet-related social network application to:
as a result of receiving the proximity notification of the mobile electronic device's proximity to the second mobile electronic device, display, on a computer display of the mobile electronic device, a user profile of the second social network identity corresponding to the second mobile electronic device that is in proximity to the mobile electronic device.

8. The system in accordance with claim 1, wherein the processor is further operably configured to execute instructions of the first instance of the pet-related social network application to:
receive, via the user interface of the pet-related social network application, a second user input corresponding to a rating of a pet associated with a third social network identity of a third instance of the pet-related social network application executing on a third mobile electronic device.

9. The system in accordance with claim 1, wherein:
the proximity notification is received, by the mobile electronic device, as a result of an area defined by the first user-selected geofence boundary overlapping with an area defined by a second user-selected geofence boundary associated with the second dog collar.

10. The system in accordance with claim 1, wherein:
the first user-selected geofence boundary is a dynamic geofence boundary based on a real-time current GPS location of the mobile electronic device by being automatically updated in real-time as a result of a movement of the mobile electronic device detected by a GPS receiver of the mobile electronic device.

11. The system in accordance with claim 1, wherein:
the first user-selected geofence boundary is formed as a circle with the mobile electronic device as a center of the circle and the user input is a radius of the circle, the circle moving automatically as the mobile electronic device moves such that the center of the circle remains the mobile electronic device and the radius of the circle remains as indicated by the user input.

12. A pet-related method comprising:
displaying, on a display of a mobile electronic device communicatively coupled to a first dog collar over a network, a user interface of a first instance of a pet-related social network application, the first instance of the pet-related social network application associated with a first social network identity;
receiving, by a processor of the mobile electronic device, via the user interface of the pet-related social network application, a user input corresponding a first user-selected geofence boundary of a first dog collar;
communicating, by the processor of the mobile electronic device, the first user-selected geofence boundary to the first dog collar;
determining, by a processor and a GPS receiver included in the first dog collar, if the first dog collar is at or outside of the first user-selected geofence boundary; and
receiving, by the processor of the mobile electronic device, a proximity notification of the mobile electronic device's proximity to a second mobile electronic device, the second mobile electronic device communicatively coupled to a second dog collar, different from the first dog collar, and the second mobile electronic device operably configured to execute instructions of a second instance of the pet-related social network application, the second instance of the pet-related social network application associated with a second social network identity, different from the first social network identity.

13. The method in accordance with claim 12, further comprising:
receiving, by the processor of the mobile electronic device, via the user interface of the pet-related social network application, a second user input corresponding to a second geofence warning boundary different from the first user-selected geofence boundary, the second geofence warning boundary disposed simultaneously with and within the first user-selected geofence boundary so as to provide a warning prior to the first dog collar being at or outside of the first user-selected geofence boundary; and
as a result of receiving the second user input, communicating, by the mobile electronic device, the second geofence warning boundary to the first dog collar, the processor of the first dog collar operably configured to determine if the first dog collar is at or outside of the second geofence warning boundary.

14. The method in accordance with claim 13, further comprising:
providing the first dog collar with a shocking device; and
shocking a dog wearing the first dog collar as a result of the processor of the first dog collar determining that the first dog collar is at or outside of the first user-selected geofence boundary.

15. The method in accordance with claim 14, further comprising:
providing the first dog collar with a warning indicator that is formed as at least one of a vibrator and a speaker; and
at least one of vibrating, via the vibrator, and emitting, via the speaker, an audible warning to the dog wearing the first dog collar, prior to shocking the dog, as a result of the processor determining that the first dog collar is at or outside of the second geofence warning boundary.

16. The method in accordance with claim 12, further comprising:
receiving, by the processor of the mobile electronic device, via the user interface of the pet-related social network application, a second user input corresponding to a screening selection to prevent the second mobile electronic device from receiving a notification of the mobile electronic device's proximity to the second mobile electronic device.

17. The method in accordance with claim 12, wherein receiving the proximity notification further includes:
receiving the proximity notification as a result of an area defined by the first user-selected geofence boundary overlapping with an area defined by a second user-selected geofence boundary associated with the second dog collar.

18. The method in accordance with claim 12, wherein:
the first user-selected geofence boundary is a dynamic geofence boundary based on a real-time current GPS location of the mobile electronic device by being automatically updated in real-time as a result of a movement of the mobile electronic device determined by a GPS receiver of the mobile electronic device.

19. A pet-related system comprising:
a first pet accessory including a GPS receiver and a processor operably configured to determine if the first pet accessory is at or outside of a first user-selected geofence boundary; and
a mobile electronic device communicatively coupled to the first pet accessory, over a network, and including a processor operably configured to execute instructions of a first instance of a pet-related social network application to:
display a user interface of the pet-related social network application, the first instance of the pet-related social network application associated with a first social network identity;
receive, via the user interface of the pet-related social network application, a user input corresponding to the first user-selected geofence boundary of the first pet accessory;
communicate the first user-selected geofence boundary to the first pet accessory; and
receive a proximity notification of the mobile electronic device's proximity to a second mobile electronic device, the second mobile electronic device communicatively coupled to a second pet accessory, different from the first pet accessory, and the second mobile electronic device operably configured to execute instructions of a second instance of the pet-related social network application, the second instance of the pet-related social network application associated with a second social network identity, different from the first social network identity.

20. The system in accordance with claim 19, wherein:
the pet accessory is a dog collar.

* * * * *